United States Patent
Minard et al.

(10) Patent No.: US 9,016,519 B2
(45) Date of Patent: Apr. 28, 2015

(54) CONCENTRATE LEVEL SENSING

(75) Inventors: James J. Minard, South Beloit, IL (US); Mark E. Bush, Rockton, IL (US)

(73) Assignee: Carrier Commercial Refrigeration, Inc., Charlotte, NC (US)

( * ) Notice: Subject to any disclaimer, the term of this patent is extended or adjusted under 35 U.S.C. 154(b) by 1914 days.

(21) Appl. No.: 12/091,215

(22) PCT Filed: Dec. 12, 2005

(86) PCT No.: PCT/US2005/045129
§ 371 (c)(1),
(2), (4) Date: Apr. 23, 2008

(87) PCT Pub. No.: WO2007/070037
PCT Pub. Date: Jun. 21, 2007

(65) Prior Publication Data
US 2008/0272143 A1 Nov. 6, 2008

(51) Int. Cl.
*B67D 1/00* (2006.01)
*B67D 1/10* (2006.01)
*F04B 7/06* (2006.01)

(52) U.S. Cl.
CPC .... *B67D 1/10* (2013.01); *F04B 7/06* (2013.01)

(58) Field of Classification Search
USPC ........... 222/56, 59, 68, 71, 129, 129.3, 145.5, 222/145.7, 133, 129.1, 63
See application file for complete search history.

(56) References Cited

U.S. PATENT DOCUMENTS

| | | | |
|---|---|---|---|
| 3,974,681 A * | 8/1976 | Namery | ............................ 73/600 |
| 4,753,370 A | 6/1988 | Rudick | |
| 5,033,644 A | 7/1991 | Tentler | |
| 5,741,980 A * | 4/1998 | Hill et al. | .................... 73/861.04 |
| 6,446,834 B2 | 9/2002 | Davis et al. | |
| 6,932,114 B2 | 8/2005 | Sparks | |
| 7,349,814 B2 * | 3/2008 | Venkatachari et al. | ......... 702/50 |

OTHER PUBLICATIONS

Search Report PCT/US05/45129.
International Preliminary Report on Patentability dated Jun. 26, 2008.

* cited by examiner

*Primary Examiner* — Frederick C Nicolas
(74) *Attorney, Agent, or Firm* — Carlson, Gaskey & Olds, P.C.

(57) ABSTRACT

A beverage system includes a pump that draws a set mount of a flavored concentrate into a mixing chamber through a conduit for mixing with water to form a beverage. A sensor detects when the amount of the flavored concentrate in the conduit or in the container is low or out. The sensor includes two wings each including a recessed surface that together defines a circular space. A portion of the conduit is received in the circular space. Each of the wings includes an ultrasonic portion that emits ultrasonic waves that are non-intrusive. When the amount of flavored concentrate in the conduit is low, air bubbles are generated in the flow along the conduit and/or a vacuum is created in the conduit to draw the conduit away from the recessed surface. The ultrasonic waves detect either of these two features, indicating that the amount of the flavored concentrate is low.

14 Claims, 6 Drawing Sheets

CONCENTRATE LEVEL SENSING

This application is a United States National Phase application of PCT Application No. PCT/US2005/045129 filed Dec. 12, 2005.

BACKGROUND OF THE INVENTION

The present invention relates generally to a sensor employed in a beverage system that uses ultrasonic waves to sense when a level of flavored concentrate is low.

Beverages systems are employed to make beverages. A flavored concentrate and water are mixed to form the beverage. Typically, the flavored concentrate is stored in a concentrate container. A piston of a pump nutates within a pump head to draw a set amount of the flavored concentrate into a mixing chamber. Water is mixed with the flavored concentrate in the mixing chamber to form the beverage with a desired concentration.

If the amount of the flavored concentrate in the concentrate container runs low, the beverage can dilute, affecting the taste and quality of the beverage. Prior sensors directly measure the amount or volume of the flavored concentrate in the concentrate container. A drawback to prior sensors is that the sensor is intrusive with the concentrate container.

Hence, there is a need in the art for a sensor employed in a beverage system that uses ultrasonic waves to sense when a level of flavored concentrate is low that is non-intrusion that overcomes the drawbacks and shortcomings of the prior art.

SUMMARY OF THE INVENTION

A beverage system makes beverages, soft drinks, milkshakes, dairy products, other frozen desserts or any mixed product. A pump draws a set amount of a flavored concentrate into a mixing chamber through a conduit. The flavored concentrate and water combine in the mixing chamber to form the beverage.

A piston of a pump nutates within a pump head to draw the set amount of the flavored concentrate into the mixing chamber. The pump includes an adapter plate that aligns the piston and a housing of a motor. A locking ring attaches the adapter plate to the pump head.

A sensor detects when the amount of the flavored concentrate in the conduit is low. The sensor includes two wings each including a recessed surface that together define a circular space. A portion of the conduit is received in the circular space. Each of the wings includes an ultrasonic portion that emits ultrasonic waves that are non-intrusive.

When the concentrate container begins to empty and the amount of concentrate in the conduit is low, air bubbles are generated in the flow of the flavored concentrate. The ultrasonic waves that are generated by the ultrasonic portions detect the air bubbles. The ultrasonic portions send a signal to a controller indicating that the level of flavored concentrate in the conduit is low. The controller sends a signal to the pump to stop operation of the pump.

As the amount of flavored concentrate in the conduit, and therefore the concentrate container, decreases, a vacuum is also created in the conduit. The vacuum causes the walls of the conduit to cave inwardly and away from the wings, disengaging the conduit from the recessed surface of the wings. When the conduit does not engage the recessed surface of the wings, the ultrasonic waves produced by the ultrasonic portion are not transmitted to the flavored concentrate flowing through the conduit. The presence of the vacuum indicates that the volume of the flavored concentrate in the conduit is low and the concentrate container needs to be replaced.

These and other features of the present invention will be best understood from the following specification and drawings.

BRIEF DESCRIPTION OF THE DRAWINGS

The various features and advantages of the invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
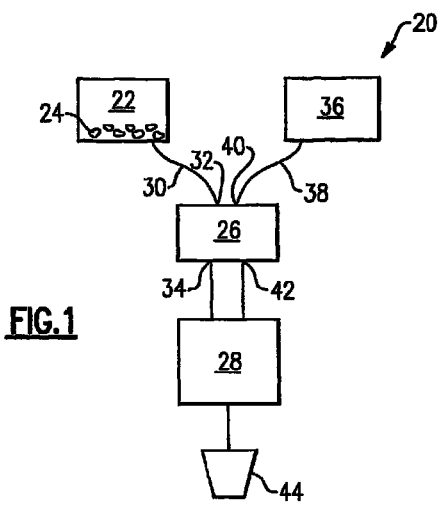
FIG. 1 schematically illustrates a beverage system used to make a beverage.

FIG. 1 schematically illustrates a beverage system 20 of the present invention. The beverage system 20 can be used to make beverages, soft drinks, milkshakes, dairy products, juices, other frozen desserts or any mixed product. The beverage system 20 includes a concentrate container 22 that contains a flavored concentrate 24 or syrup. In one example, the concentrate container 22 is a sealed bag that is cooled by a refrigeration system (not shown).

A pump 26 draws a set amount of the flavored concentrate 24 from the concentrate container 22 and into a mixing chamber 28. The flavored concentrate 24 from the concentrate container 22 flows along a conduit 30 and into a concentrate inlet 32 of the pump 26. The pump 26 controls the flow and the amount of the flavored concentrate 24 that is dispensed by the pump 26 through a concentrate outlet 34 and into the mixing chamber 28. Chilled water from a water source 36 cooled by a refrigeration system (not shown) flows along a conduit 38 and enters the pump 26 through a water port 40. In one example, the conduit 38 is made of copper. The pump 26 controls the flow of water through a water outlet 42 and into the mixing chamber 28. All the conduit 30 and 38 to the inlets 32 and 40, respectively, of the mixing chamber 28 are insulated.

The flavored concentrate 24 and the water are thoroughly mixed in the mixing chamber 28 to create the beverage having a desired concentration. The mixing chamber 28 is insulated to keep the mixed beverage cold. In one example, the concentration of water to flavored concentrate 24 is approximately 10:1 through 2:1. The beverage is then dispensed from the mixing chamber 28 into a cup 44 for serving.

Figure 2:
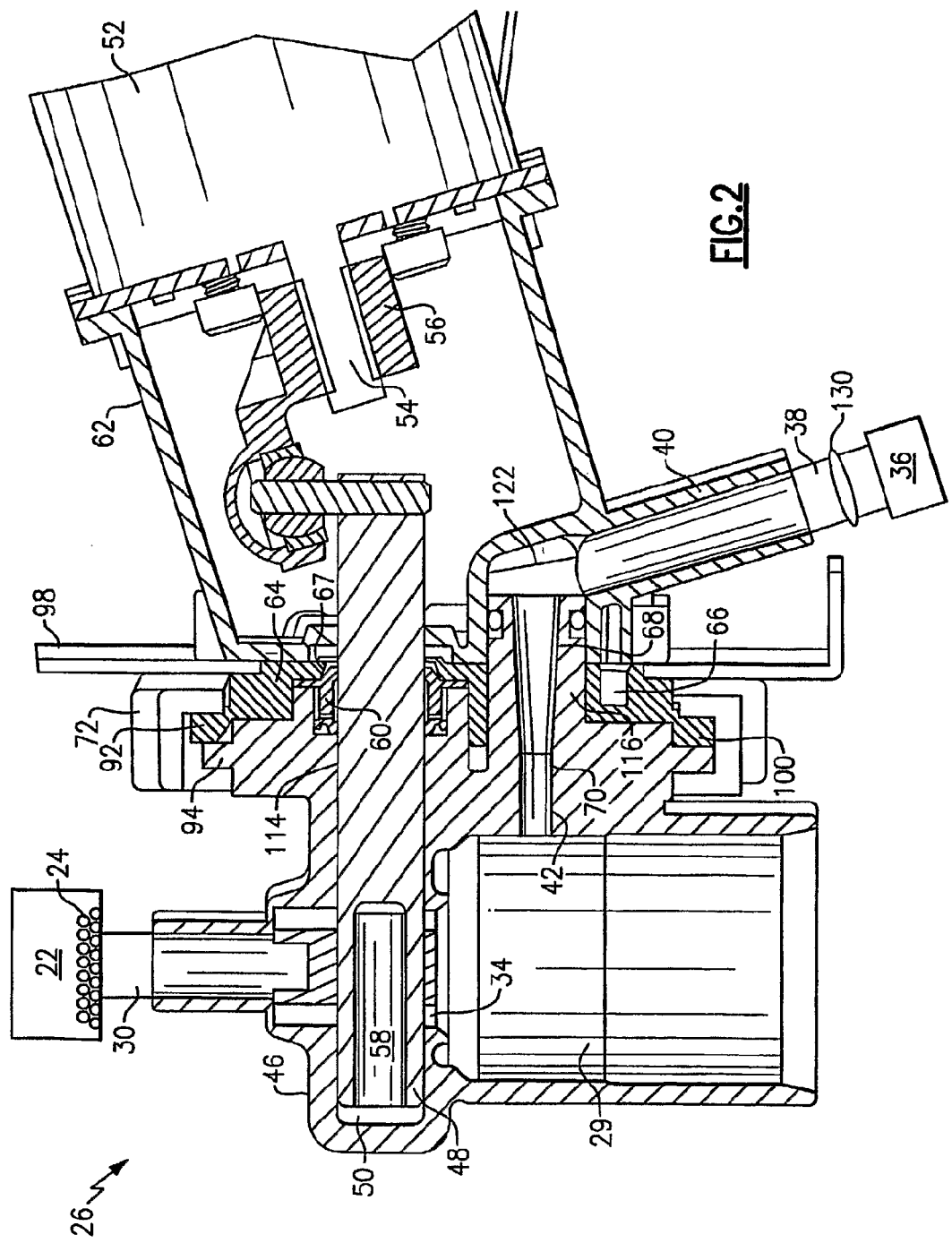
FIG. 2 schematically illustrates a cross-sectional view of a pump of the beverage system.

FIG. 2 schematically illustrates the pump 26 including a pump head 46. The flavored concentrate 24 in the concentrate container 22 flows along the conduit 30 and enters the pump head 46 through the concentrate inlet 32. A portion of a piston 48 received in a compartment 50 of the pump head 46 is substantially cylindrical in shape and includes an irregular surface 58. In one example, the irregular surface 58 can be a flattened surface or a substantially unshaped depression. A cavity is defined between the irregular surface 58 of the piston 48 and the walls of the compartment 50. The compartment 50 has a fixed volume and does not expand or contract during operation of the pump 26. In one example, the piston 48 is made of stainless steel, and the compartment 50 is made of steel. The piston 48 controls the flow of the flavored concentrate 24 from the concentrate container 22 and into the mixing chamber 28 (shown in FIG. 3) that is housed in a mixing chamber housing 29. The pump 26 is described in U.S. patent application Ser. No. 10/955,175 filed Sep. 30, 2004 and entitled POSITIVE DISPLACEMENT PUMP, herein incorporated entirely by reference.

The pump 26 includes a motor 52 that drives a motor shaft 54. The motor 52 moves the piston 48 to draw the flavored concentrate 24 into the cavity through the concentrate inlet 32 and to release the flavored concentrate 24 from the cavity through the concentrate outlet 34. The concentrate outlet 34 functions as a top portion of the mixing chamber 28. The motor shaft 54 includes a hub assembly 56. The hub assembly 56 is a plastic molded part that holds brass components that allow for free rotation within the degrees of the pump 26 operation. As the motor shaft 54 rotates, the hub assembly 56 also rotates. Engagement of the hub assembly 56 with the piston 48 causes the piston 48 to both move linearly and to rotate. That is, the piston 48 nutates.

Figure 3:
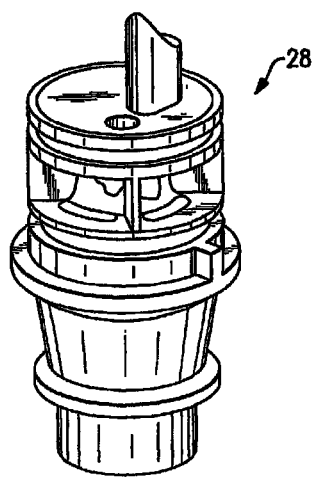
FIG. 3 schematically illustrates a perspective view of a mixing chamber of the pump.

As shown in FIG. 3, a housing 62 aligns the motor 52 and the motor shaft 54 and mounts the motor 52 to an assembly panel 98. The housing 62 includes a water port 40 that provides a path for the water from the water source 36 to flow into a water chamber 112, through a water port 116 of a pump head 46, along a water flow path 70 and into the mixing chamber 28 to form the beverage. The water port 40 is integrated with the housing 62 in one piece.

A piston seal 60 provides a seal between the piston 48 and the pump head 46 and provides a wiping action as the piston 48 moves in the pump head 46. The piston seal 60 is made from an elastomeric material and overmolded onto a steel backing ring. A backing seal 66 provides a barrier between a wetted portion of the pump head 46 and the water port 40 of the housing 62 to prevent accidental spillage or splashing of the flavored concentrate 24 or a cleaning solution from entering the hub assembly 56.

Figure 4:
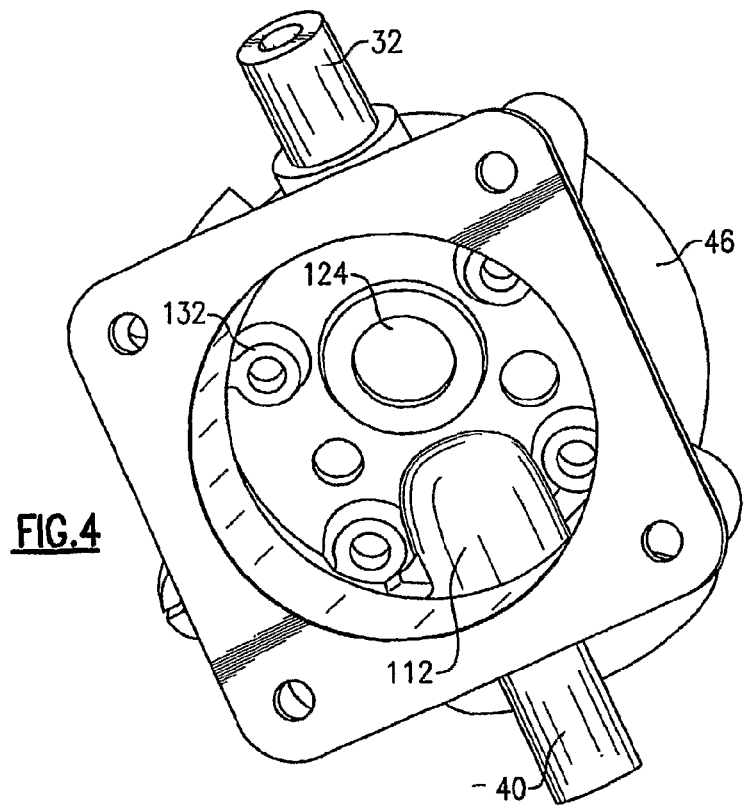
FIG. 4 schematically illustrates a side view of a pump head and a housing of the pump.
Figure 5:
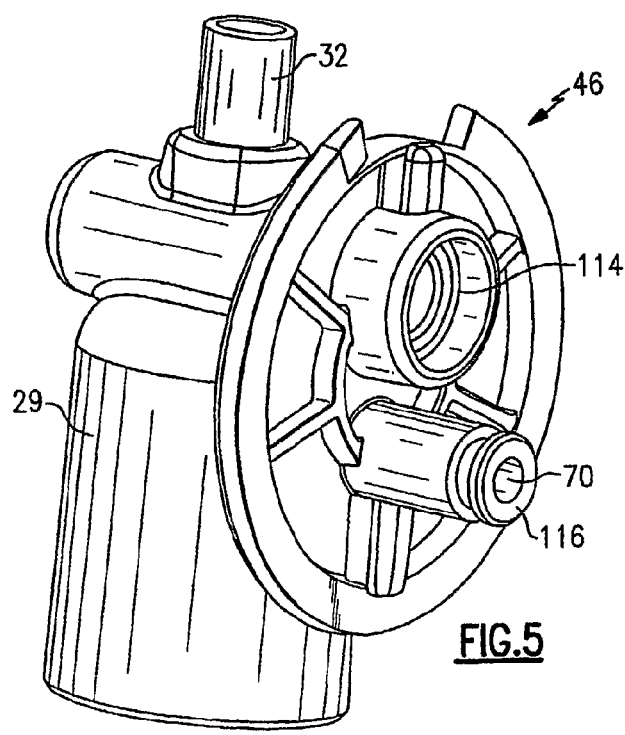
FIG. 5 schematically illustrates a perspective view of the pump head.

FIGS. 4 and 5 illustrate the pump head 46. The pump head 46 includes a circumferential flange 94 that extends around the circumference of the pump head 46. The pump head 46 also includes a piston opening 114 that receives a portion of the piston 48 and the water port 116 that detects a portion of the water flow path 70.

Figure 6:
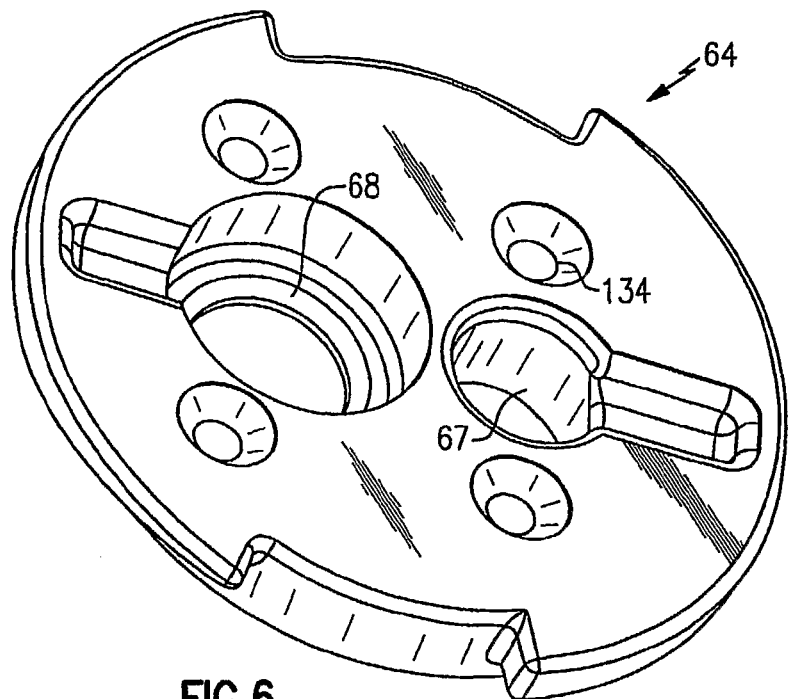
FIG. 6 schematically illustrates a perspective view of an adapter plate of the pump.
Figure 7:
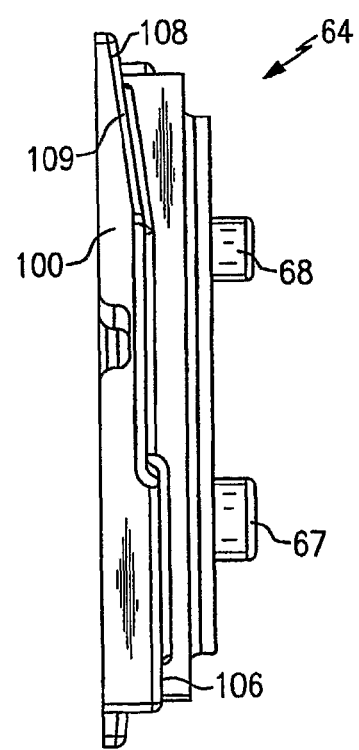
FIG. 7 schematically illustrates a side view of the adapter plate.

As shown in FIGS. 6 and 7, the pump 26 further includes an adapter plate 64 that maintains a geometric relationship between the piston 48 and the piston opening 124 of the housing 62 and minimizes movement of the piston 48. The adapter plate 64 includes a piston opening 67 that receives a portion of the piston 48 and a water opening 68 that receives the water port 116 of the pump head 46. The adapter plate 64 includes a circumferential flange 100. The circumferential flange 100 includes two opposing ramped portions each having a lower part 108, an inclined part 109 and a raised upper part 106. The adapter plate 64 also includes a corresponding another of a protrusion or recess 134 that surrounds the piston opening 67. When the adapter plate 64 is assembled in the pump 26, the protrusions or recesses 132 align with the another of the protrusion or a recess 134 to align the adapter plate 64 and the housing 62.

Figure 8:
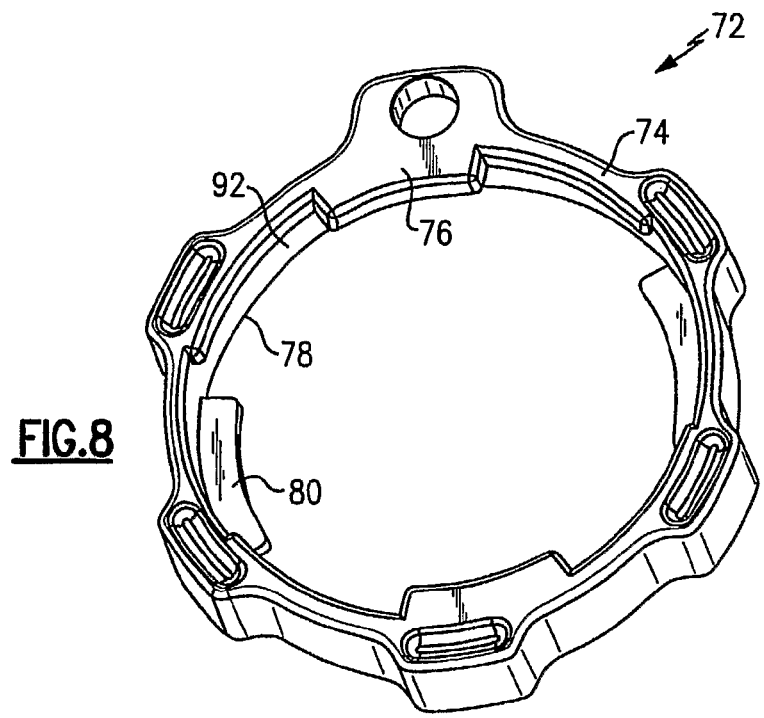
FIG. 8 schematically illustrates a perspective view of a locking ring of the pump.

As shown in FIG. 8, a locking ring 72 attaches the adapter plate 64 to the pump head 46, creating a geometric lock between the pump head 46 and the adapter plate 64. The locking ring 72 secures the pump head 46 to the adapter plate 64 to prevent leakage of the flavored concentrate 24 and the water from the pump head 46 and prevent inaccuracy. The locking ring 72 is substantially circular in shape and is made of plastic. The locking ring 72 includes a first side 74 with a plurality of first inward tabs 76 and an opposing second side 78 with a plurality of second inward tabs 80. In one example, the first side 74 includes two first inward tabs 76, and the second side 78 includes two second inward tabs 80. A gap 92 is defined between the inward tabs 76 and 80. Outward fingers 82 extend from the locking ring 72 to provide a surface for the operator to grab when rotating the locking ring 72.

The locking ring 72 and the pump head 46 are provided as a subassembly. The locking ring 72 is forced onto the pump head 46 such that the circumferential flange 94 of the pump head 46 is received in the gap 92 of the locking ring 72. The locking ring 72 freely rotates relative to the pump head 46.

Figure 9:
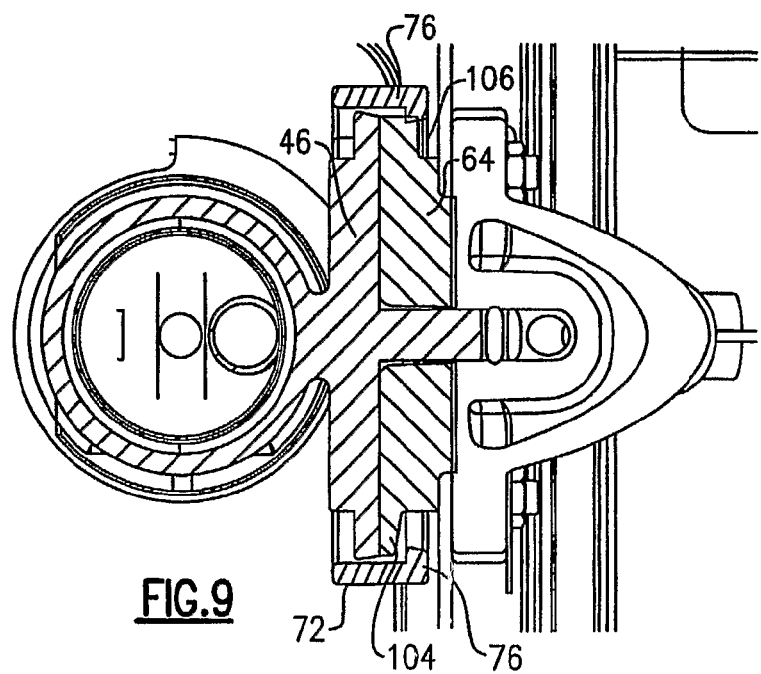
FIG. 9 schematically illustrates a top view of the pump.

When the components are installed, the circumferential flange 100 of the adapter plate 64 is positioned to be received in the gap 92 of the locking ring 72. That is, both the circumferential flange 100 of the adapter plate 64 and the circumferential flange 94 of the pump head 46 are received in the gap 92. The first inward tabs 76 of the locking ring 72 engage the adapter plate 64, and the second inward tabs 80 of the locking ring 72 engage the pump head 46. The locking ring 72 is rotated relative to the pump head 46 in a first direction until each of the first inward tabs 76 engage one of the raised upper parts 106 of the adapter plate 64 to wedge the locking ring 72 in the locked position and to attach the adapter plate 64 to the pump head 46, as shown in FIG. 9. The engagement of the locking ring 72 and the raised upper part 106 of the adapter plate 64 prevents the locking ring 72 from further rotation, and the locking ring 72 is then stopped in a locked position.

Figure 10:
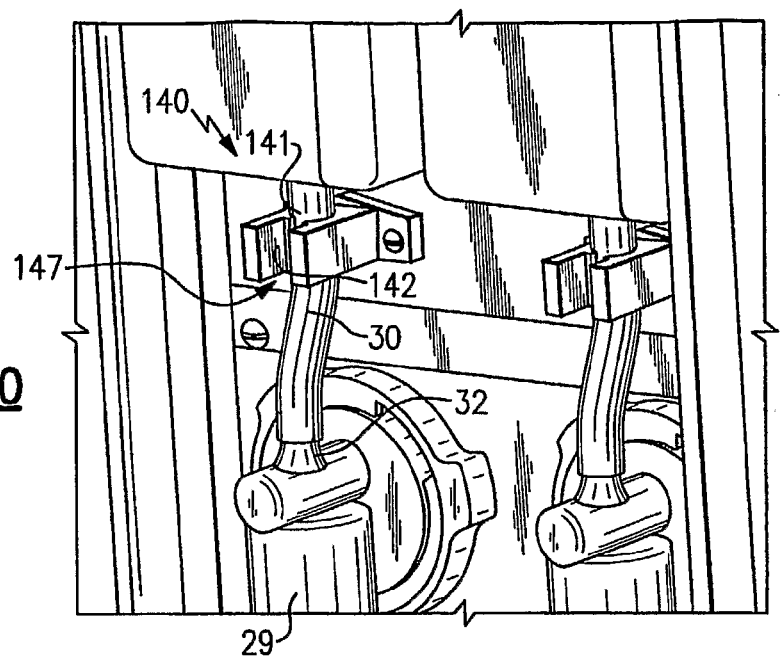
FIG. 10 schematically illustrates a perspective view of the sensor during normal operation.
Figure 11:
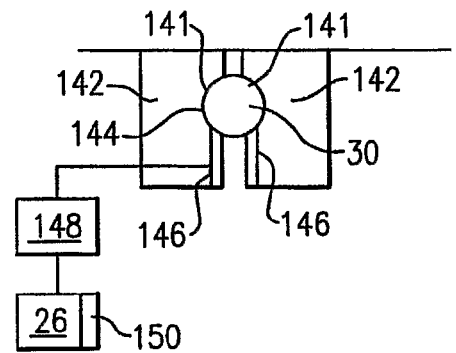
FIG. 11 schematically illustrates a top view of the sensor during normal operation.

As shown in FIGS. 10 and 11, a sensor 140 detects when the amount of the flavored concentrate 24 in the conduit 30 is low. The sensor 140 is non-invasive. When the amount of flavored concentrate 24 is low, the beverage can be diluted, affecting the quality of the beverage. The sensor 140 includes two wings 142 each including a recessed surface 141 that together define a circular space 144. A portion of the conduit 30 is received in the circular space 144. In one example, the conduit 30 is made of plastic. Each of the wings 142 includes an ultrasonic portion 146 that emits ultrasonic waves that are non-intrusive. A gap 147 is defined between the ultrasonic portions 146.

When the concentrate container 22 contains the flavored concentrate 24, the flavored concentrate 24 flows from the concentrate container 22 along the conduit 30 and into the pump 26 for mixing with water to form the beverage. When the concentrate container 22 is not empty and there is flavored concentrate 24 in the conduit 30, there are no air bubbles in the flavored concentrate 24 as it flows along the conduit 30. During normal operation when the concentrate container 22 is not empty, the walls of the conduit 30 contact the recessed surface 141 of the wings 142.

Figure 12:
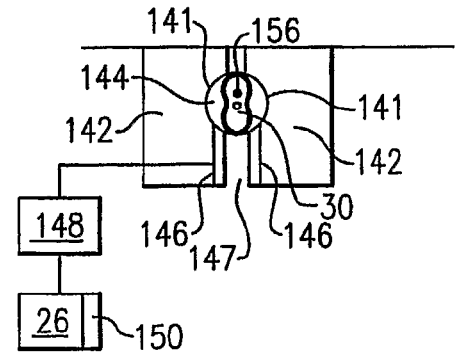
FIG. 12 schematically illustrates a top view of the sensor when the amount of flavored concentrate in the conduit is low.

As shown in FIG. 12, when the conduit 30 begins to become empty and drops below a threshold value, air bubbles 156 are generated in the flow of the flavored concentrate 24 as it flows along the conduit 30. The ultrasonic waves that are generated by the ultrasonic portions 146 detect the air bubbles 156. The ultrasonic portions 146 send a signal to a controller 148 indicating that the level of flavored concentrate 24 in the conduit 30, and therefore the concentrate container 22, is low. The controller 148 sends a signal to the pump 26 to stop operation of the pump 26. The operator is alerted that the amount of the flavored concentrate 24 in the concentrate container 22 is low and that the operator needs to replace the concentrate container 22. The low level of the flavored concentrate 24 can be indicated on an LED 150 display. The pump 26 also prevents any more beverages or products from being dispensed.

As the amount of the flavored concentrate 24 in the conduit 30 decreases and drops below a threshold value, a vacuum is also created in the conduit 30. The vacuum causes the walls of the conduit 30 to cave inwardly and away from the wings 142, disengaging the conduit 30 from the recessed surface 141 of the wings 142. When the conduit 30 does not engage the recessed surface 141 of the wings 142, the ultrasonic waves produced by the ultrasonic portion 146 do not transmit to the flavored concentrate 24 flowing through the conduit 30. The presence of the vacuum indicates that the volume of the flavored concentrate 24 in the concentrate container 22 is low and the concentrate container 22 needs to be replaced. The controller 148 sends a signal to the pump 26 to stop operation of the pump 26. The operator is alerted that the amount of the flavored concentrate 24 in the concentrate container 22 is low and that the operator needs to replace the concentrate container 22. The low level of the flavored concentrate 24 can be indicated on the LED 150 display.

Either or both of detecting air bubbles 156 or detecting the presence of a vacuum in the conduit 30 will trigger the controller 148 to shut the pump 26 down. The signal received by the controller 148 can also be filtered and modified as necessary to minimize false triggers and ensure that the sensor 140 performs optimally.

Although a beverage system 20 is illustrated and described, it is to be understood that the pump 26 of the present invention can be used in other systems. For example, the pump 26 can be used in a soft drink system. In this example, the pump 26 pumps flavored syrup which is mixed with carbonated water to make a soft drink. Alternately, the pump 26 pumps flavored syrup which is mixed with a frozen substance to create a frozen dessert.

The foregoing description is only exemplary of the principles of the invention. Many modifications and variations are possible in light of the above teachings. It is, therefore, to be understood that within the scope of the appended claims, the invention may be practiced otherwise than using the example embodiments which have been specifically described. For that reason the following claims should be studied to determine the true scope and content of this invention.

What is claimed is:

1. A concentrate system comprising:
a fluid conduit, wherein concentrate flows from a concentrate container to a pump along the fluid conduit, wherein the pump includes a piston moveable by a motor to draw the concentrate into a mixing chamber, a pump head including a pump head piston opening that receives the piston and a pump head water port, and an adapter plate including an adapter plate piston opening that receives the piston and a water opening that receives the pump head water port of the pump head;
a locking ring that secures the adapter plate to the pump head; and
an ultrasonic sensor that generates ultrasonic waves to detect the concentrate in the fluid conduit and to detect when an amount of the concentrate in the fluid conduit is below a threshold value, wherein the ultrasonic sensor is located between the concentrate container and the pump.

2. The system as recited in claim 1 wherein the ultrasonic sensor includes two wing portions each including a recessed portion that together define a space, wherein the fluid conduit is received in the space.

3. The system as recited in claim 1 wherein the fluid conduit is plastic.

4. The system as recited in claim 1 wherein air bubbles form in the concentrate in the fluid conduit when the amount of the concentrate in the fluid conduit reduces below the threshold value, and the ultrasonic sensor detects the air bubbles to indicate that the amount of the concentrate in the fluid conduit is below the threshold value.

5. The system as recited in claim 1 wherein the pump controls a flow of the concentrate into a mixing chamber.

6. The system as recited in claim 5 further including a water source and a water line, wherein the water line provides water from the water source and into the mixing chamber to mix with the concentrate to form a beverage.

7. The system as recited in claim 1 further including a controller, wherein the controller shuts down the pump when the ultrasonic sensor detects that the amount of the concentrate in the fluid conduit is below the threshold value.

8. A concentrate system comprising:
a fluid conduit, wherein concentrate flows from a concentrate container to a pump along the fluid conduit; and
an ultrasonic sensor that generates ultrasonic waves to detect the concentrate in the fluid conduit and to detect when an amount of the concentrate in the fluid conduit is below a threshold value, wherein the ultrasonic sensor is located between the concentrate container and the pump,
wherein a vacuum in the fluid conduit causes the fluid conduit to cave inwardly and disengage from the ultrasonic sensor when the amount of the concentrate in the fluid conduit is below the threshold value to indicate that the amount of the concentrate in the fluid conduit is below the threshold value.

9. A concentrate system comprising:
a concentrate container containing a concentrate;
a fluid conduit, wherein the concentrate flows from the concentrate container to a pump along the fluid conduit;
an ultrasonic sensor that generates ultrasonic waves to detect the concentrate in the fluid conduit and to detect when an amount of the concentrate in the fluid conduit is below a threshold value;
the pump that controls a flow of the concentrate into a mixing chamber, wherein the ultrasonic sensor is located between the concentrate container and the pump, wherein the pump includes a piston moveable by a motor to draw the concentrate into a mixing chamber, a pump head including a pump head piston opening that receives the piston and a pump head water port, and an adapter plate including an adapter plate piston opening that receives the piston and a water opening that receives the pump head water port of the pump head;
a locking ring that secures the adapter plate to the pump head; and a controller, wherein the controller shuts down the pump when the ultrasonic sensor detects that the amount of the concentrate in the fluid conduit is below the threshold value.

10. The system as recited in claim 9 wherein the ultrasonic sensor includes two wing portions each including a recessed portion that together define a space, wherein the fluid conduit is received in the space.

11. The system as recited in claim 9 wherein the fluid conduit is plastic.

12. The system as recited in claim 9 wherein air bubbles form in the concentrate in the fluid conduit when the amount of the concentrate in the fluid conduit reduces below the threshold value, and the ultrasonic sensor detects the air bubbles to indicate that the amount of the concentrate in the fluid conduit is below the threshold value.

13. A concentrate system comprising:
a concentrate container containing a concentrate;
a fluid conduit, wherein the concentrate flows from the concentrate container to a pump along the fluid conduit;
an ultrasonic sensor that generates ultrasonic waves to detect the concentrate in the fluid conduit and to detect when an amount of the concentrate in the fluid conduit is below a threshold value;
the pump that controls a flow of the concentrate into a mixing chamber, wherein the ultrasonic sensor is located between the concentrate container and the pump; and
a controller, wherein the controller shuts down the pump when the ultrasonic sensor detects that the amount of the concentrate in the fluid conduit is below the threshold value,
wherein a vacuum in the fluid conduit causes the fluid conduit to cave inwardly and disengage from the ultrasonic sensor when the amount of the concentrate in the fluid conduit is below the threshold value to indicate that the amount of the concentrate in the fluid conduit is below the threshold value.

14. The system as recited in claim 13 further including a water source and a water line, wherein the water line provides water from the water source and into the mixing chamber to mix with the concentrate to form a beverage.

* * * * *